United States Patent
Koka

(10) Patent No.: US 12,472,356 B2
(45) Date of Patent: *Nov. 18, 2025

(54) SYSTEMS FOR OPTIMIZING EVOKED RESPONSE SIGNAL GENERATION DURING AN ELECTRODE LEAD INSERTION PROCEDURE

(71) Applicant: Advanced Bionics AG, Staefa (CH)

(72) Inventor: Kanthaiah Koka, Valencia, CA (US)

(73) Assignee: Advanced Bionics AG, Staefa (CH)

( * ) Notice: Subject to any disclaimer, the term of this patent is extended or adjusted under 35 U.S.C. 154(b) by 785 days.

This patent is subject to a terminal disclaimer.

(21) Appl. No.: 17/620,019

(22) PCT Filed: Jul. 10, 2019

(86) PCT No.: PCT/US2019/041136
§ 371 (c)(1),
(2) Date: Dec. 16, 2021

(87) PCT Pub. No.: WO2021/006892
PCT Pub. Date: Jan. 14, 2021

(65) Prior Publication Data
US 2022/0305264 A1    Sep. 29, 2022

(51) Int. Cl.
*A61N 1/36* (2006.01)
*A61N 1/02* (2006.01)
*A61N 1/05* (2006.01)
*A61N 1/08* (2006.01)

(52) U.S. Cl.
CPC .........  *A61N 1/36039* (2017.08); *A61N 1/025* (2013.01); *A61N 1/0541* (2013.01); *A61N 1/08* (2013.01); *A61N 1/36171* (2013.01)

(58) Field of Classification Search
CPC .. A61N 1/025; A61N 1/0541; A61N 1/36039; A61N 1/36171
See application file for complete search history.

(56) References Cited

U.S. PATENT DOCUMENTS

2013/0006328 A1   1/2013  Bouchataoui et al.
2015/0320550 A1  11/2015  Downing et al.
(Continued)

FOREIGN PATENT DOCUMENTS

CN   107371113 A   11/2017
CN   107847739 A    3/2018
(Continued)

OTHER PUBLICATIONS

"International Search Report and Written Opinion received in International Application No. PCT/US20/30834."
(Continued)

*Primary Examiner* — Joseph M Dietrich
(74) *Attorney, Agent, or Firm* — ALG Intellectual Property, LLC

(57) ABSTRACT

A diagnostic system is disclosed that is configured to direct an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient, direct the cochlear implant to use an electrode disposed on the electrode lead to record an evoked response signal during the insertion procedure, the evoked response signal representing amplitudes of a plurality of evoked responses that occur within the recipient in response to the acoustic stimulation applied to the recipient, and incrementally step, as the electrode lead is inserted into the values starting with an initial value and ending with a final value lower than the initial value.

16 Claims, 15 Drawing Sheets

(56) References Cited

U.S. PATENT DOCUMENTS

2019/0030323 A1  1/2019  Koka
2019/0045680 A1  2/2019  Kondo

FOREIGN PATENT DOCUMENTS

| CN | 108601937 A | 9/2018 |
|---|---|---|
| WO | 2017065809 | 4/2017 |
| WO | 2019045680 | 3/2019 |
| WO | 2019045747 | 3/2019 |

OTHER PUBLICATIONS

"International Search Report and Written Opinion received in International Application No. PCT/US2019/041136."

Greenwood, DD et al., "A cochlear frequency-position function for several species—29 years later", Journal of the Acoustical Society of America, vol. 87, 1990, 2592-2605.

Greenwood, et al., "Critical bandwidth and the frequency coordinates of the basilar membrane", J. Acoust. Soc. Am. 33, 1344-1356, 1961.

Kohllöffel, et al., "Longitudinal Amplitude and Phase Distribution of the Cochlear Microphonic (Guinea Pig) and Spatial Filtering", Journal of Sound and Vibration, vol. 11, Issue 3, Mar. 1970, pp. 325-334.

Riggs, et al., "Intra-Cochlear Electrocochleography During Cochear Implant Electrode Insertion is Predictive of Final Scalar Location", Otology & Neurotology, vol. 39, No. 8, 2018 (7), 654-659.

Stakhovskaya, et al., "Frequency map for the human cochlear spiral ganglion: Implications for cochlear implants", JARO—Journal of the Association for Research in Otolaryngology, 8(2), 220-233.

SYSTEMS FOR OPTIMIZING EVOKED RESPONSE SIGNAL GENERATION DURING AN ELECTRODE LEAD INSERTION PROCEDURE

BACKGROUND INFORMATION

During an insertion procedure in which an electrode lead is placed within the cochlea, it may be desirable to monitor evoked responses (e.g., electrocochleographic ("ECoG" or "ECochG") potentials) that occur within the recipient in response to acoustic stimulation applied to the recipient. These evoked responses may be indicative of electrode positioning within the cochlea, trauma that may occur to the cochlea during the insertion procedure, residual hearing of different areas of the cochlea as the electrode lead is inserted, and/or various other factors associated with the insertion procedure.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
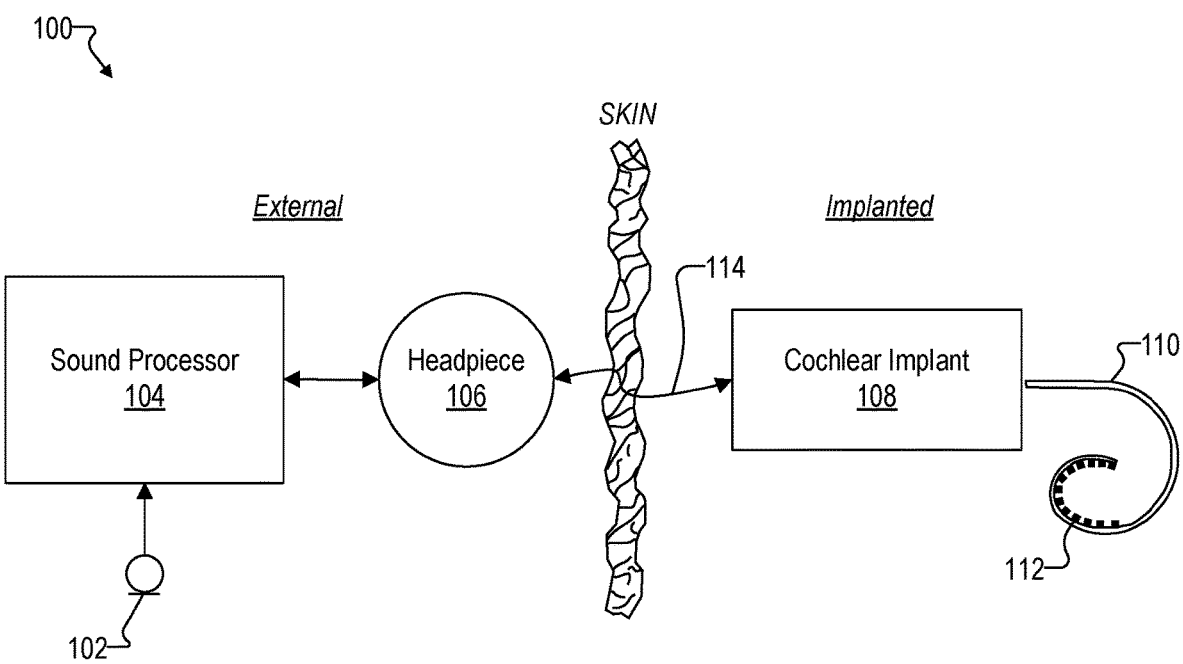
FIG. 1 illustrates an exemplary cochlear implant system according to principles described herein.

Systems and methods for optimizing evoked response signal generation during an electrode lead insertion procedure are described herein. For example, a diagnostic system may direct an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient. The diagnostic system may direct the cochlear implant to use an electrode disposed on the electrode lead to record an evoked response signal during the insertion procedure. The evoked response signal represents amplitudes of a plurality of evoked responses that occur within the recipient in response to the acoustic stimulation applied to the recipient. The evoked responses may each be an ECoG potential (e.g., a cochlear microphonic potential, an action potential, a summating potential, etc.), an auditory nerve response, a brainstem response, a compound action potential, a stapedius reflex, and/or any other type of neural or physiological response that may occur within a recipient in response to application of acoustic stimulation to the recipient. Evoked responses may originate from neural tissues, hair cell to neural synapses, inner or outer hair cells, or other sources.

As the electrode lead is inserted into the cochlea, the diagnostic system may step the stimulus frequency through a sequence of decreasingly lower values starting with an initial value and ending with a final value lower than the initial value. As described herein, this stepping of the stimulus frequency through decreasingly lower values is based on an intracochlear positioning of the electrode used to record the evoked responses.

For example, the diagnostic system may maintain data representative of a sequence of decreasingly lower values to which the stimulus frequency may be set. An exemplary sequence of decreasingly lower values includes 4 kHz, 2 kHz, 1 kHz, 500 Hz, and 250 Hz. These values are merely exemplary, and additional or alternative values may be included in the sequence as may serve a particular implementation.

Prior to a commencement of the electrode lead insertion procedure, the diagnostic system may set the stimulus frequency to be equal to an initial value (e.g., 4 kHz) included in the sequence of decreasingly lower values. As the electrode lead is being inserted (e.g., by a surgeon or other user) into the cochlea of a recipient of a cochlear implant, the diagnostic system may direct an acoustic stimulation generator to apply acoustic stimulation having the initial stimulus frequency value to the recipient while a distal-most electrode disposed on the electrode lead (or any other designated electrode on the electrode lead) records evoked responses that occur in response to the acoustic stimulation. As the electrode lead is advanced further into the cochlea, the diagnostic system may determine that the electrode passes a characteristic frequency location within the cochlea that corresponds to the initial stimulus frequency value. This characteristic frequency location may be based, for example, on a cochlear tonotopic map.

In response to determining that the electrode passes the characteristic frequency location corresponding to the initial stimulus frequency value, the diagnostic system may decrease the stimulus frequency from the initial value to a next lower value (e.g., 2 kHz) in the sequence of decreasingly lower values. Once the diagnostic system determines that the electrode lead passes a characteristic frequency location within the cochlea that corresponds to this next lower value, the diagnostic system may again decrease the stimulation frequency to a next lower value (e.g., 1 kHz) in the sequence of decreasingly lower values. This process may be repeated for the remaining values included in the sequence of decreasingly lower values as the electrode lead is inserted further into the cochlea.

As another example, the diagnostic system may direct an acoustic stimulation generator to apply acoustic stimulation having a plurality of stimulus frequencies (e.g., concurrently) to a recipient of a cochlear implant during an insertion procedure in which an electrode lead communicatively coupled to the cochlear implant is inserted into a cochlea of the recipient. The diagnostic system may direct the cochlear implant to use an electrode disposed on the electrode lead to record a plurality of evoked response signals during the insertion procedure, the evoked response signals each corresponding to a different stimulus frequency included in the plurality of stimulus frequencies. The diagnostic system may plot, by way of a display device, a graph of the evoked response signals in substantially real time as the insertion procedure is being performed by switching between displaying each evoked response signal included in the plurality of evoked response signals such that, at any given time, only a single evoked response that has a highest amplitude compared to other evoked response signals in the plurality of evoked response signals is displayed by the display device.

By incrementally stepping the stimulus frequency through a sequence of decreasingly lower values while the electrode lead is inserted further into the cochlea and/or by applying acoustic stimulation having a plurality of stimulus frequencies and plotting the graph as described above, the systems and methods described herein may optimize evoked response signal generation during an electrode insertion procedure in a manner that conveys more accurate, useful, and effective feedback to a user compared to techniques that only use a single stimulus frequency value (e.g., 500 Hz) for the entire electrode lead insertion procedure. For example, a graph of the evoked response signal may be presented to the user in substantially real time during the insertion procedure, which may allow the user to visually ascertain electrode positioning within the cochlea, trauma that may occur to the cochlea during the insertion procedure, and/or various other factors associated with the insertion procedure. To illustrate, each time the electrode passes a characteristic frequency location associated with a current value of the stimulus frequency, the evoked response signal should peak and begin decreasing. However, if the decrease occurs before the electrode passes the characteristic frequency location, this may indicate that the electrode lead is causing damage to the cochlea. Such information may not be ascertainable in techniques that only use a single stimulus frequency value (e.g., 500 Hz) for the entire electrode lead insertion procedure. These and other benefits and advantages of the systems and methods described herein will be made apparent herein.

FIG. 1 illustrates an exemplary cochlear implant system 100. As shown, cochlear implant system 100 may include a microphone 102, a sound processor 104, a headpiece 106 having a coil disposed therein, a cochlear implant 108, and an electrode lead 110. Electrode lead 110 may include an array of electrodes 112 disposed on a distal portion of electrode lead 110 and that are configured to be inserted into a cochlea of a recipient to stimulate the cochlea when the distal portion of electrode lead 110 is inserted into the cochlea. One or more other electrodes (e.g., including a ground electrode, not explicitly shown) may also be disposed on other parts of electrode lead 110 (e.g., on a proximal portion of electrode lead 110) to, for example, provide a current return path for stimulation current generated by electrodes 112 and to remain external to the cochlea after electrode lead 110 is inserted into the cochlea. As shown, electrode lead 110 may be pre-curved so as to properly fit within the spiral shape of the cochlea. Additional or alternative components may be included within cochlear implant system 100 as may serve a particular implementation.

As shown, cochlear implant system 100 may include various components configured to be located external to a recipient including, but not limited to, microphone 102, sound processor 104, and headpiece 106. Cochlear implant system 100 may further include various components configured to be implanted within the recipient including, but not limited to, cochlear implant 108 and electrode lead 110.

Microphone 102 may be configured to detect audio signals presented to the user. Microphone 102 may be implemented in any suitable manner. For example, microphone 102 may include a microphone that is configured to be placed within the concha of the ear near the entrance to the ear canal, such as a T-MIC™ microphone from Advanced Bionics. Such a microphone may be held within the concha of the ear near the entrance of the ear canal during normal operation by a boom or stalk that is attached to an ear hook configured to be selectively attached to sound processor 104. Additionally or alternatively, microphone 102 may be implemented by one or more microphones disposed within headpiece 106, one or more microphones disposed within sound processor 104, one or more beam-forming microphones, and/or any other suitable microphone as may serve a particular implementation.

Sound processor 104 may be configured to direct cochlear implant 108 to generate and apply electrical stimulation (also referred to herein as "stimulation current") representative of one or more audio signals (e.g., one or more audio signals detected by microphone 102, input by way of an auxiliary audio input port, input by way of a clinician's programming interface (CPI) device, etc.) to one or more stimulation sites associated with an auditory pathway (e.g., the auditory nerve) of the recipient. Exemplary stimulation sites include, but are not limited to, one or more locations within the cochlea, the cochlear nucleus, the inferior colliculus, and/or any other nuclei in the auditory pathway. To this end, sound processor 104 may process the one or more audio signals in accordance with a selected sound processing strategy or program to generate appropriate stimulation parameters for controlling cochlear implant 108. Sound processor 104 may be housed within any suitable housing (e.g., a behind-the-ear ("BTE") unit, a body worn device, headpiece 106, and/or any other sound processing unit as may serve a particular implementation).

In some examples, sound processor 104 may wirelessly transmit stimulation parameters (e.g., in the form of data words included in a forward telemetry sequence) and/or power signals to cochlear implant 108 by way of a wireless communication link 114 between headpiece 106 and cochlear implant 108 (e.g., a wireless link between a coil disposed within headpiece 106 and a coil physically coupled to cochlear implant 108). It will be understood that communication link 114 may include a bi-directional communication link and/or one or more dedicated uni-directional communication links.

Headpiece 106 may be communicatively coupled to sound processor 104 and may include an external antenna (e.g., a coil and/or one or more wireless communication components) configured to facilitate selective wireless coupling of sound processor 104 to cochlear implant 108. Headpiece 106 may additionally or alternatively be used to selectively and wirelessly couple any other external device to cochlear implant 108. To this end, headpiece 106 may be configured to be affixed to the recipient's head and positioned such that the external antenna housed within headpiece 106 is communicatively coupled to a corresponding implantable antenna (which may also be implemented by a coil and/or one or more wireless communication components) included within or otherwise associated with cochlear implant 108. In this manner, stimulation parameters and/or power signals may be wirelessly transmitted between sound processor 104 and cochlear implant 108 via communication link 114.

Cochlear implant 108 may include any suitable type of implantable stimulator. For example, cochlear implant 108 may be implemented by an implantable cochlear stimulator. Additionally or alternatively, cochlear implant 108 may include a brainstem implant and/or any other type of cochlear implant that may be implanted within a recipient and configured to apply stimulation to one or more stimulation sites located along an auditory pathway of a recipient.

In some examples, cochlear implant 108 may be configured to generate electrical stimulation representative of an audio signal processed by sound processor 104 (e.g., an audio signal detected by microphone 102) in accordance with one or more stimulation parameters transmitted thereto by sound processor 104. Cochlear implant 108 may be further configured to apply the electrical stimulation to one or more stimulation sites (e.g., one or more intracochlear regions) within the recipient via electrodes 112 disposed along electrode lead 110. In some examples, cochlear implant 108 may include a plurality of independent current sources each associated with a channel defined by one or more of electrodes 112. In this manner, different stimulation current levels may be applied to multiple stimulation sites simultaneously by way of multiple electrodes 112.

Figure 2:
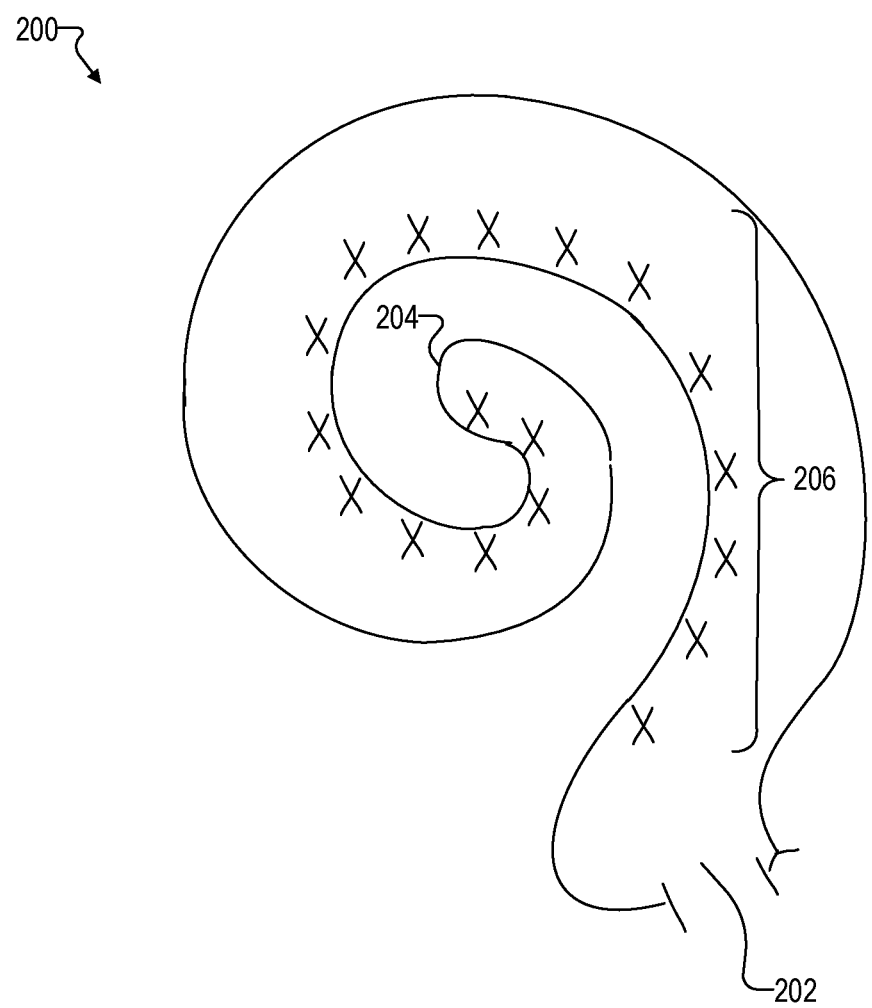
FIG. 2 illustrates a schematic structure of the human cochlea according to principles described herein.

FIG. 2 illustrates a schematic structure of the human cochlea 200 into which electrode lead 110 may be inserted. As shown in FIG. 2, cochlea 200 is in the shape of a spiral beginning at a base 202 and ending at an apex 204. Within cochlea 200 resides auditory nerve tissue 206, which is denoted by Xs in FIG. 2. The auditory nerve tissue 206 is organized within the cochlea 200 in a tonotopic manner. Relatively low frequencies are encoded at or near the apex 204 of the cochlea 200 (referred to as an "apical region") while relatively high frequencies are encoded at or near the base 202 (referred to as a "basal region"). Hence, electrical stimulation applied by way of electrodes disposed within the apical region (i.e., "apical electrodes") may result in the recipient perceiving relatively low frequencies and electrical stimulation applied by way of electrodes disposed within the basal region (i.e., "basal electrodes") may result in the recipient perceiving relatively high frequencies. The delineation between the apical and basal electrodes on a particular electrode lead may vary depending on the insertion depth of the electrode lead, the anatomy of the recipient's cochlea, and/or any other factor as may serve a particular implementation.

Figure 3:
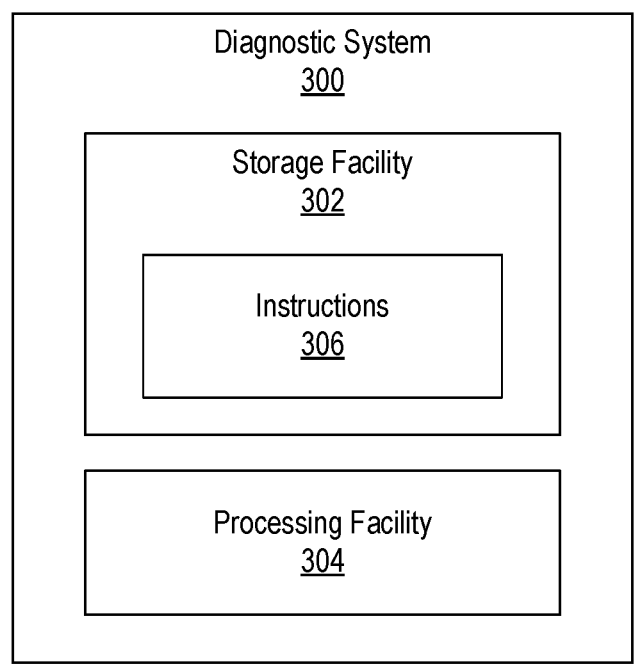
FIG. 3 illustrates an exemplary diagnostic system according to principles described herein.

FIG. 3 illustrates an exemplary diagnostic system 300 that may be configured to perform any of the operations described herein. As shown, diagnostic system 300 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform any of the operations described herein. For example, storage facility 302 may store instructions 306 that may be executed by processing facility 304 to perform any of the operations described herein. Instructions 306 may be implemented by any suitable application, software, code, and/or other executable data instance. Storage facility 302 may also maintain any data received, generated, managed, used, and/or transmitted by processing facility 304.

Processing facility 304 may be configured to perform (e.g., execute instructions 306 stored in storage facility 302 to perform) various operations. For example, processing facility 304 may direct an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient, direct the cochlear implant to use an electrode disposed on the electrode lead to record (e.g., detect) an evoked response signal during the insertion procedure (e.g., during all or only a portion of the insertion procedure), and incrementally step, as the electrode lead is inserted into the cochlea, the stimulus frequency through a sequence of decreasingly lower values starting with an initial value and ending with a final value lower than the initial value. Data representative of the recorded evoked response signal may be stored by processing facility 304 in storage facility 302 and/or in any other suitable storage medium as may serve a particular implementation.

Additionally or alternatively, processing facility 304 may direct an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, direct the cochlear implant to use an electrode disposed on the electrode lead to record a plurality of evoked response signals during the insertion procedure, the evoked response signals each corresponding to a different stimulus frequency included in the plurality of stimulus frequencies, and plot, by way of a display device, a graph of the evoked response signals in substantially real time as the insertion procedure is being performed by switching between displaying each evoked response signal included in the plurality of evoked response signals such that, at any given time, only a single evoked response that has a highest amplitude compared to other evoked response signals in the plurality of evoked response signals is displayed by the display device. These and other operations that may be performed by processing facility 304 are described in more detail herein.

Figure 4:
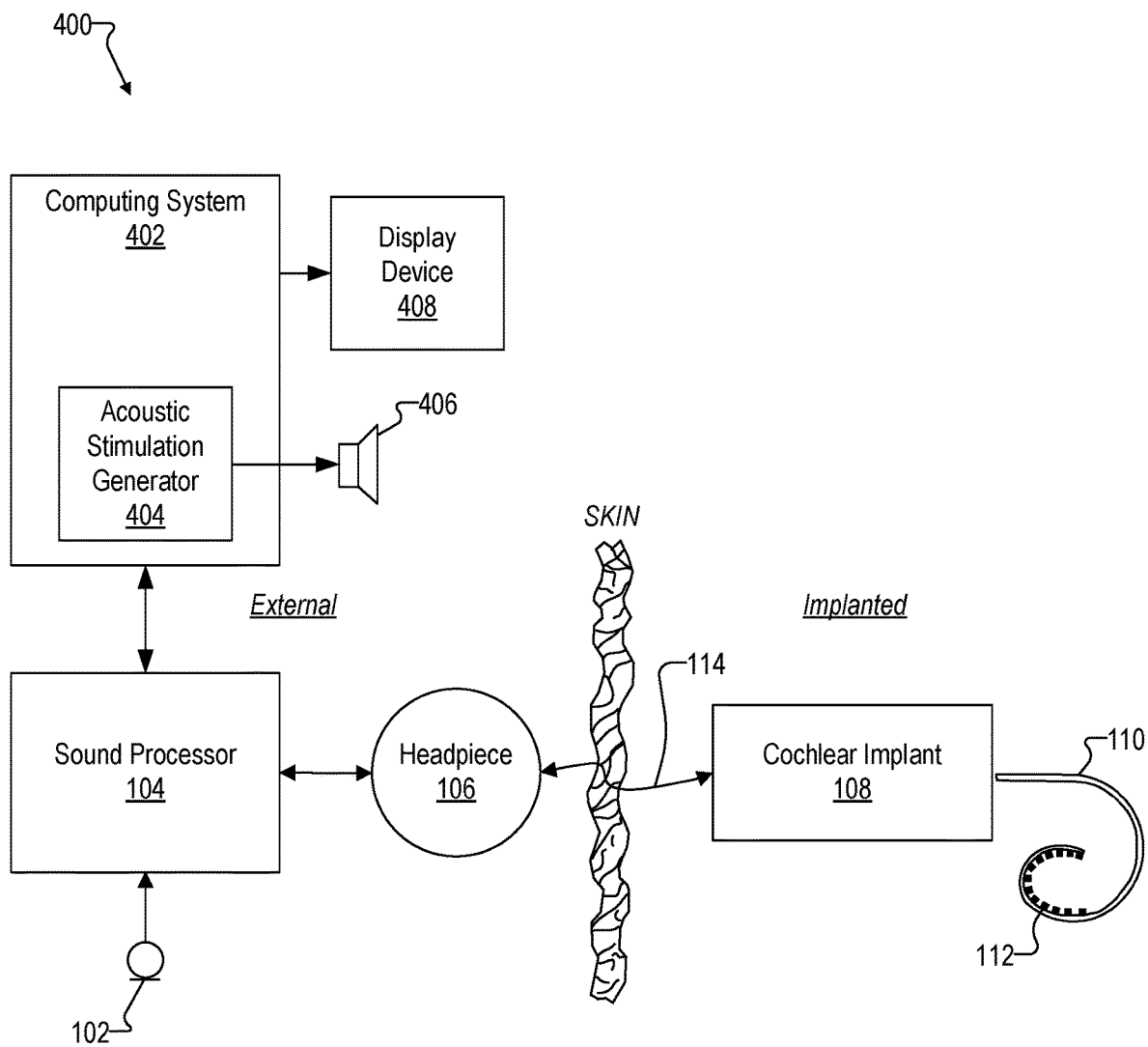
FIGS. 4-5 illustrate exemplary implementations of the diagnostic system of FIG. 3 according to principles described herein.

Diagnostic system 300 may be implemented in any suitable manner. For example, FIG. 4 shows an exemplary configuration 400 in which diagnostic system 300 is implemented by a computing system 402 configured to communicatively couple to sound processor 104. As shown, computing system 402 may include an acoustic stimulation generator 404 communicatively coupled to a speaker 406. Computing system 402 is also communicatively coupled to a display device 408.

Computing system 402 may be implemented by any suitable combination of hardware (e.g., one or more computing devices) and software. For example, computing system 402 may be implemented by a computing device programmed to perform one or more fitting operations with respect to a recipient of a cochlear implant. To illustrate, computing system 402 may be implemented by a desktop computer, a mobile device (e.g., a laptop, a smartphone, a tablet computer, etc.), and/or any other suitable computing device as may serve a particular implementation.

Acoustic stimulation generator 404 may be implemented by any suitable combination of components configured to generate acoustic stimulation. In some examples, the acoustic stimulation may include one or more tones having one or more stimulus frequencies. Additionally or alternatively, the acoustic stimulation may include any other type of acoustic content that has at least a particular stimulus frequency of interest. Speaker 406 may be configured to deliver the acoustic stimulation generated by acoustic stimulation generator 404 to the recipient. For example, speaker 406 may be implemented by an ear mold configured to be placed in or near an entrance to an ear canal of the recipient.

Display device 408 may be implemented by any suitable device configured to display graphical content generated by computing system 402. For example, display device 408 may display one or more graphs of evoked responses recorded by an electrode disposed on electrode lead 110. In some alternative embodiments, display device 408 is integrated into computing system 402.

Figure 5:
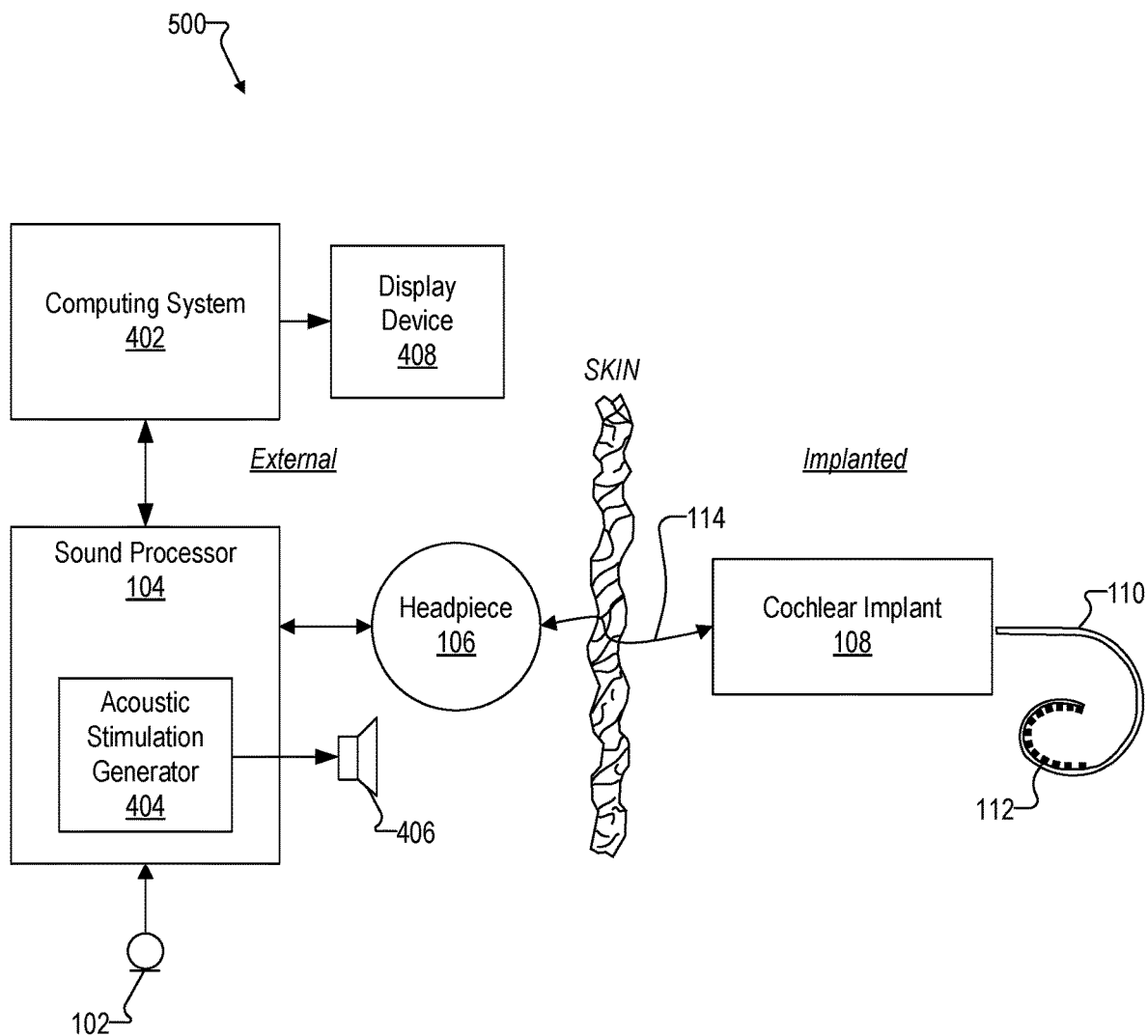

FIG. 5 shows another exemplary configuration 500 in which diagnostic system 400 is implemented by computing system 402. In configuration 500, acoustic stimulation generator 404 is included in sound processor 104. For example, sound processor 104 may be implemented by a bimodal sound processor (i.e., a sound processor configured to direct cochlear implant 108 to apply electrical stimulation to a recipient and acoustic stimulation generator 404 to apply acoustic stimulation to the recipient). In some examples, speaker 406 may be implemented by an audio ear hook that connects to sound processor 104.

FIGS. 6A-6F illustrate an exemplary insertion procedure in which an electrode lead 600 is inserted into a cochlea 602 of a recipient. For illustrative purposes, cochlea 602 is depicted in FIGS. 6A-6F as being "unrolled" instead of its actual curved, spiral shape. Lead 600 may be similar to lead 110 and may include a plurality of electrodes (e.g., electrodes 604-1 through electrode 604-16) disposed thereon. Electrode 604-1 is a distal-most electrode on lead 600 and electrode 604-16 is a proximal-most electrode on lead 600.

Various characteristic frequency locations within cochlea 602 are depicted by vertical dashed lines in each of FIGS. 6A-6F. As shown, a first characteristic frequency location is associated with 4 kHz. Hence, electrical stimulation applied by an electrode positioned at this characteristic frequency location may result in the recipient perceiving sound having 4 kHz. FIGS. 6A-6F also depict characteristic frequency locations associated with 2 kHz, 1 kHz, 500 Hz, and 250 Hz. As shown, the frequencies associated with the characteristic frequency locations are tonotopically arranged, with relatively higher frequencies being located towards the entrance (or base) of cochlea 602 and relatively lower frequencies being located towards the distal end (or apex) of cochlea 602.

Figure 6A:
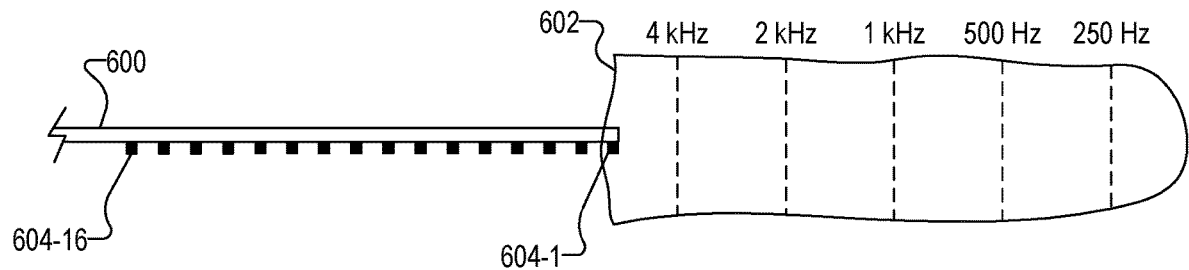
FIGS. 6A-6F illustrate an exemplary insertion procedure in which an electrode lead is inserted into a cochlea of a recipient according to principles described herein.
Figure 6B:
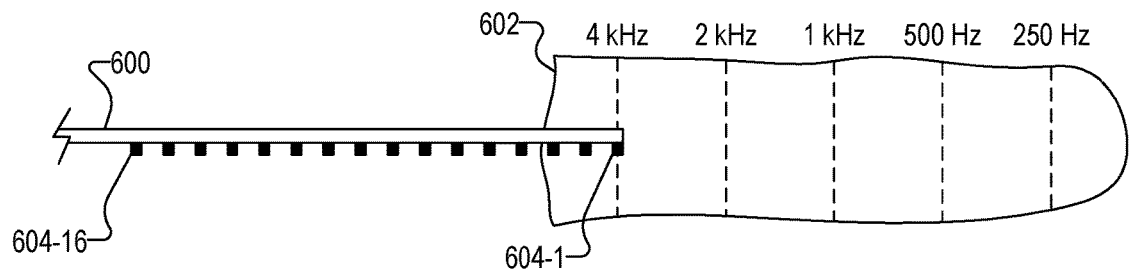
Figure 6C:
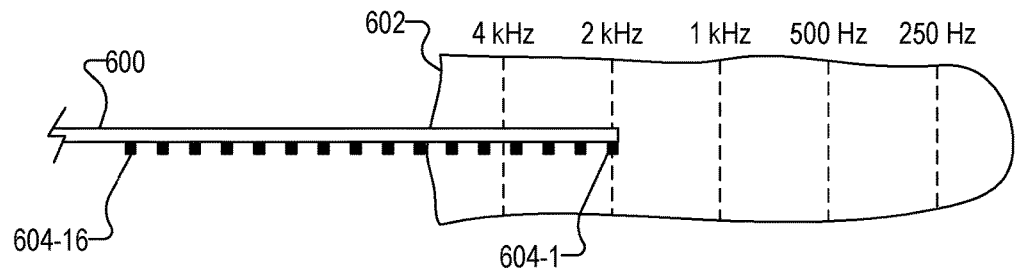
Figure 6D:
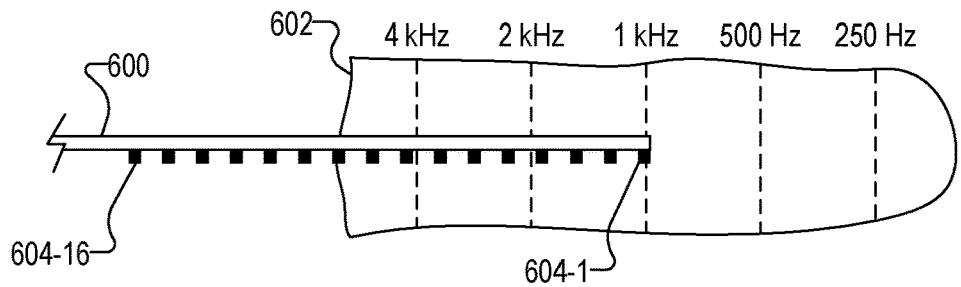
Figure 6E:
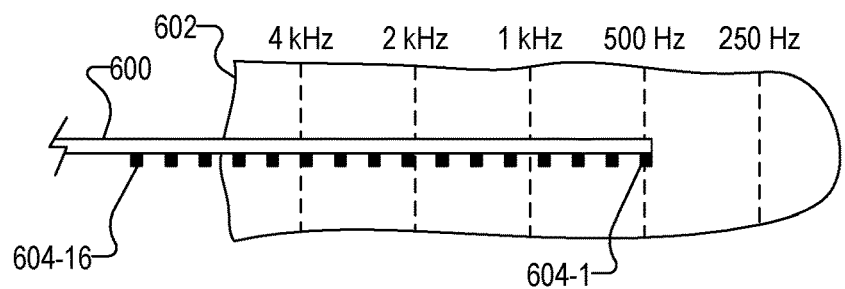
Figure 6F:
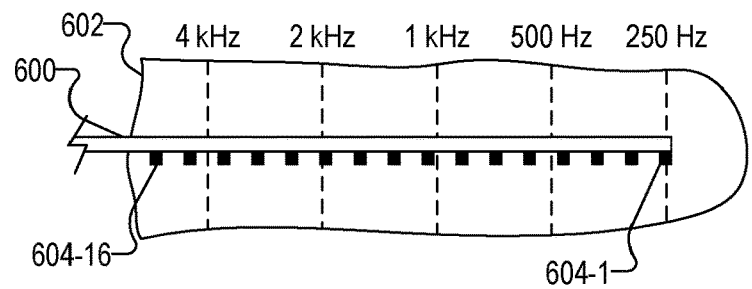

FIG. 6A shows electrode lead 600 entering cochlea 602. In this figure, electrode 604-1 is barely within cochlea 602. FIG. 6B shows electrode lead 600 after electrode lead 600 has been advanced further into cochlea 602 such that electrode 604-1 is positioned at the characteristic frequency location corresponding to 4 kHz. FIGS. 6C-6F show electrode lead 600 after electrode lead 600 has been advanced further into cochlea 602 such that electrode 604-1 is positioned at the characteristic frequency location corresponding to 2 kHz (FIG. 6C), then 1 kHz (FIG. 6D), then 500 Hz (FIG. 6E), and then 250 Hz (FIG. 6F).

Diagnostic system 300 may determine that electrode 604-1 passes a particular characteristic frequency location in any suitable manner. For example, diagnostic system 300 may determine that electrode 604-1 passes a particular characteristic frequency location by performing an excitation spread measurement (e.g., a cross impedance measurement) with respect to electrode 604-1 and at least one other electrode disposed on electrode lead 600. Based on the excitation spread measurement, diagnostic system 300 may determine a number of electrodes disposed on electrode lead 300 that are located within cochlea 602. Depending on the determined number of electrodes within cochlea 602, diagnostic system 300 may determine (e.g., estimate) a positioning of electrode 604-1 in cochlea 602.

For example, if diagnostic system 300 determines that three electrodes are within cochlea 602, diagnostic system 300 may determine that electrode 604-1 is positioned at the characteristic frequency location corresponding to 4 kHz. As another example, if diagnostic system 300 determines that six electrodes are within cochlea 602, diagnostic system 300 may determine that electrode 604-1 is positioned at the characteristic frequency location corresponding to 2 kHz. The relationship between number of electrode within cochlea 602 and the positioning of electrode 604-1 may be determined and/or defined in any suitable manner. In some examples, diagnostic system 300 maintains data (e.g., in the form of a lookup table) representative of this relationship.

As used herein, an "excitation spread measurement" may refer to any measurement configured to determine the extent to which stimulation (e.g., an electrical pulse) applied by one electrode at one location may spread or travel (e.g., through fluid and/or tissue at and surrounding the location) so as to be detectable (e.g., as a voltage) by another electrode at another location. As such, an excitation spread measurement as performed by the systems and methods described herein may be similar to a conventional impedance measurement in which stimulation is applied by an electrode and then detected by the same electrode (e.g., with reference to a ground electrode, with reference to another separate stimulating electrode, etc.). However, in contrast with conventional impedance measurements, excitation spread measurements as performed by the systems and methods described herein may apply stimulation with a different and distinct electrode from the electrode used to record (e.g., detect) the stimulation (e.g., a voltage resulting from the application of the stimulation) as the stimulation spreads. As such, in some examples, an excitation spread measurement may also be referred to as a "cross impedance" measurement or the like.

As one example of how an excitation spread measurement may be performed, diagnostic system 300 may direct a first electrode (e.g., electrode 604-1) to generate an electrical pulse and, in response to the generation of the electrical pulse, may detect a voltage between a second electrode (e.g., another one of electrodes 604 or a ground electrode) and a reference (e.g., a ground electrode, a case ground of a cochlear implant, etc.) where both the second electrode and the reference are distinct from the first electrode. Based on the excitation spread measurement, diagnostic system 300 may determine whether at least one of the first electrode and the second electrode is located within cochlea 602.

In certain implementations, diagnostic system 300 may perform one or more of the operations described above on each electrode 604. In this way, diagnostic system 300 may detect enough information to determine not only a location for each electrode 604, but also to determine an insertion depth of electrode lead 600 as a whole. For example, at a point in time during an insertion procedure, diagnostic system 300 may determine that electrode lead 600 is located in a position in which the first X number of electrodes 604 have been inserted into cochlea 602 while the remaining Y number of electrodes 604 are still external to the cochlea (where the sum of X and Y is the total number of electrodes disposed on the electrode lead).

Figure 7:
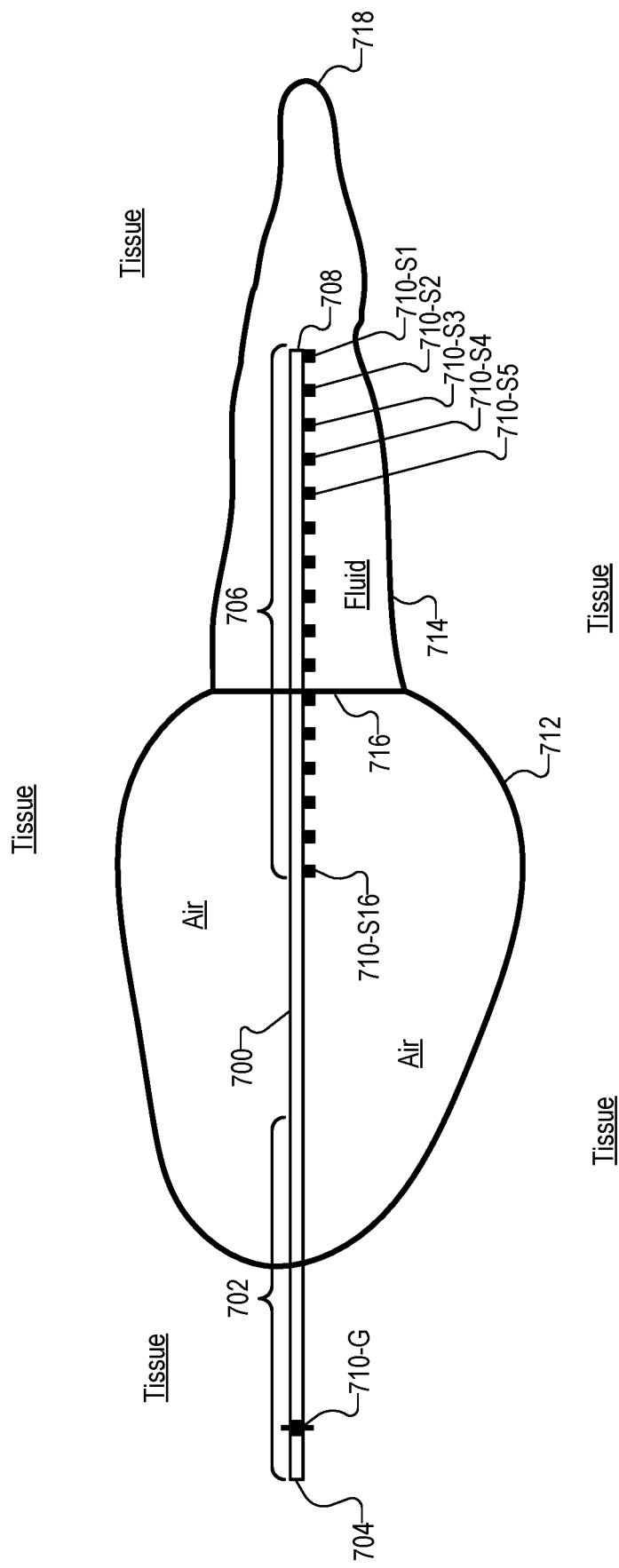
FIG. 7 illustrates how excitation spread measurements may be performed with respect to an electrode lead being inserted into a cochlea of a recipient according to principles described herein.

An example of excitation spread measurements is provided with respect to FIG. 7. In particular, FIG. 7 illustrates exemplary aspects of an electrode lead 700 and of patient anatomy as an insertion procedure is performed. Electrode lead 700 may be similar to any of the electrode leads described herein. Specifically, as shown, electrode lead 700 includes a proximal portion 702 beginning at a proximal end 704 and a distal portion 706 terminating at a distal end 708. Disposed on electrode lead 700 is a plurality of electrodes 710, including, on distal portion 706, a plurality of stimulating electrodes 710-S (e.g., stimulating electrodes 710-S1 through 710-S5 and 710-S16, which are explicitly labeled, and additional electrodes 710-S6 through 710-S15, which are not explicitly labeled in FIG. 7 but may be referred to herein), and including, on proximal portion 702, a ground electrode 710-G (e.g., a ring electrode).

FIG. 7 illustrates a particular position of electrode lead 700 during an insertion procedure in which electrode lead 700 (i.e., and proximal portion 706 in particular) is being inserted from a middle ear 712 of a patient into a cochlea 714 of the patient through a round window 716 associated with cochlea 714. For example, the goal of the insertion procedure may be to continue inserting distal portion 706 into cochlea 714 toward an apex 718 of cochlea 714 until the entirety of distal portion 706 (i.e., which may include all of electrodes 710-S) has passed through round window 716 to be located within cochlea 714.

In FIG. 7, various aspects of electrode lead 700 and the illustrated anatomical features of the patient are simplified for clarity of illustration. For instance, while cochlea 714 has been "unrolled" in FIG. 7, it will be understood that, as illustrated in FIG. 2, cochlea 714 has a curved, spiral-shaped structure and that electrode lead 700 curves to follow the spiral-shaped structure. Similarly, the anatomy of middle ear 712 and cochlea 714 omit many details and are not drawn to scale.

FIG. 7 does, however, illustrate at least one aspect of the patient's anatomy that allows diagnostic system 300 to perform excitation spread measurements. As shown, on the cochlea side of round window 716, cochlea 714 contains conductive fluid ("fluid") that, unlike gaseous fluids (e.g., air) on the other side of round window 716, is conductive to electrical currents applied to the fluid. In certain examples, diagnostic system 300 may distinguish between different fluids within cochlea 714 (e.g., perilymph in the scala vestibuli and scala tympani, endolymph in the scala media, etc.) based on different conductivities of the different fluids. In this way, diagnostic system 300 may not only distinguish electrodes located in the fluid of cochlea 714 from electrodes still located in the air of middle ear 712, but may further distinguish between electrodes located in different parts of cochlea 714 (e.g., within one of the scala vestibuli or scala tympani, within the scala media, etc.).

The fluid within cochlea 714 may carry current and provide for current conduction paths for an electrical pulse (e.g., a pulse provided by a current source or voltage source) to spread to at least some extent between electrodes 710-S that have been inserted into cochlea 714 (i.e., that are surrounded by the fluid). Thus, for example, if an electrical pulse is generated at one particular electrode 710-S, such as 710-S1, the fluid may provide a conduction path from electrode 710-S1 to other electrodes 710-S that are included within cochlea 714 (i.e., electrodes 710-S2 through 710-S10 that are surrounded by the fluid at the moment illustrated in FIG. 7) and to tissue surrounding cochlea 714. The electrical pulse may be generated by a cochlear implant or other device communicatively coupled to proximal end 704. Thus, a return path for current associated with the electrical pulse may extend from electrode 710-S1, through the fluid of cochlea 714, through the tissue associated with cochlea 714 and middle ear 712, through ground electrode 710-G, back to the voltage or current source included on the cochlear implant or other device that generated the electrical pulse.

Because the fluid inside cochlea 714 may conduct current while air outside cochlea 714 (i.e., the air in middle ear 712 on the other side of round window 716) may not effectively conduct current, only electrodes 710-S that have passed through round window 716 into cochlea 714 and are surrounded by the fluid of cochlea 714 may be able to detect the excitation spread of the electrical pulse generated by electrode 710-S1 in the example above. Electrodes 710-S that have not yet been inserted through round window 716 (e.g., electrodes 710-S11 through 710-S16 at the moment illustrated by FIG. 7) may therefore not have a viable conduction path connecting them with electrode 710-S1, and may therefore not be able to detect the excitation spread of the electrical pulse generated at electrode 710-S1.

As described above, an excitation spread measurement may be performed by generating an electrical pulse at a first electrode (e.g., electrode 710-S1 in the example above), and then detecting the electrical pulse (i.e., how the electrical pulse has spread) between a second electrode (e.g., one of electrodes 710-S2 through 710-S16 or 710-G) and a reference (e.g., ground electrode 710-G, a case ground of a cochlear implant, etc.). For example, the second electrode and the reference may both be separate from the first electrode, in contrast to how impedance measurements are typically performed. By knowing how much current or voltage was applied at the first electrode (e.g., by the current or voltage source that generates the electrical pulse) and how much current or voltage is detected at the second electrode, the extent to which the electrical pulse is able to spread between the first and second electrodes (e.g., through the fluid and/or tissue of cochlea 714) may be determined (e.g., using Ohm's Law and/or other similar principles). Accordingly, by detecting that the electrical pulse has spread to at least some extent from the first electrode to the second electrode by way of an excitation spread measurement involving an electrode known to be inserted into cochlea 714, diagnostic system 300 may determine that both electrodes are inserted into cochlea 714. However, when an electrical pulse is determined to not have spread from the first electrode to the second electrode by way of an excitation spread measurement involving an electrode known to be inserted into cochlea 714 (i.e., when the electrical pulse cannot be detected at the second electrode because no conduction path exists between the first electrode and the second electrode due, for instance, to one of the electrodes being disposed in the air of middle ear 712), diagnostic system 300 may determine that one of the electrodes has not yet entered into cochlea 714.

Moreover, by determining whether each of electrodes 710-S are located inside or outside cochlea 714 in this way, the insertion depth of the entire electrode lead 700 may be determined. For example, by determining that electrodes 710-S1 through 710-S10 are located within the fluid of cochlea 714 and that electrodes 710-S11 through 710-S16 are located within the air of middle ear 712, diagnostic system 300 may determine that electrode lead 700 is a bit more than halfway into cochlea 714 but still needs to be inserted farther, as shown.

While the example above describes excitation spread measurements in which the electrical pulse is generated at an electrode known to already be inserted into cochlea 714 (i.e., electrode 710-S1), the same excitation spread measurement principles may also work if the electrode known to already be inserted into cochlea 714 (i.e., electrode 710-S1) is used to detect an electrical pulse generated at an electrode 710-S that is under test. For example, diagnostic system 300 may determine whether electrode 710-S5, for instance, is located in cochlea 714 (i.e., whether electrode 710-S5 has a fluid conduction path with electrode 710-S1) either by generating the electrical pulse at electrode 710-S1 and attempting to detect the electrical pulse at electrode 710-S5, or vice versa, by generating the electrical pulse at electrode 710-S5 and attempting to detect the electrical pulse at electrode 710-S1. Accordingly, diagnostic system 300 may include or have control over pulse generation and detection circuitry that is flexible to perform excitation spread measurements in these different ways.

Additional details and examples of excitation spread measurements are provided in PCT Patent Publication No. WO/2019/045747, which application is incorporated by reference herein in its entirety.

Diagnostic system 300 may additionally or alternatively determine that electrode 604-1 passes a particular characteristic frequency location by detecting, within a predetermined time period, that both an amplitude of the evoked response signal recorded by electrode 604-1 decreases by at least an amplitude threshold amount and a phase of the evoked response signal recorded by electrode 604-1 changes by at least a phase threshold amount.

Figure 8:
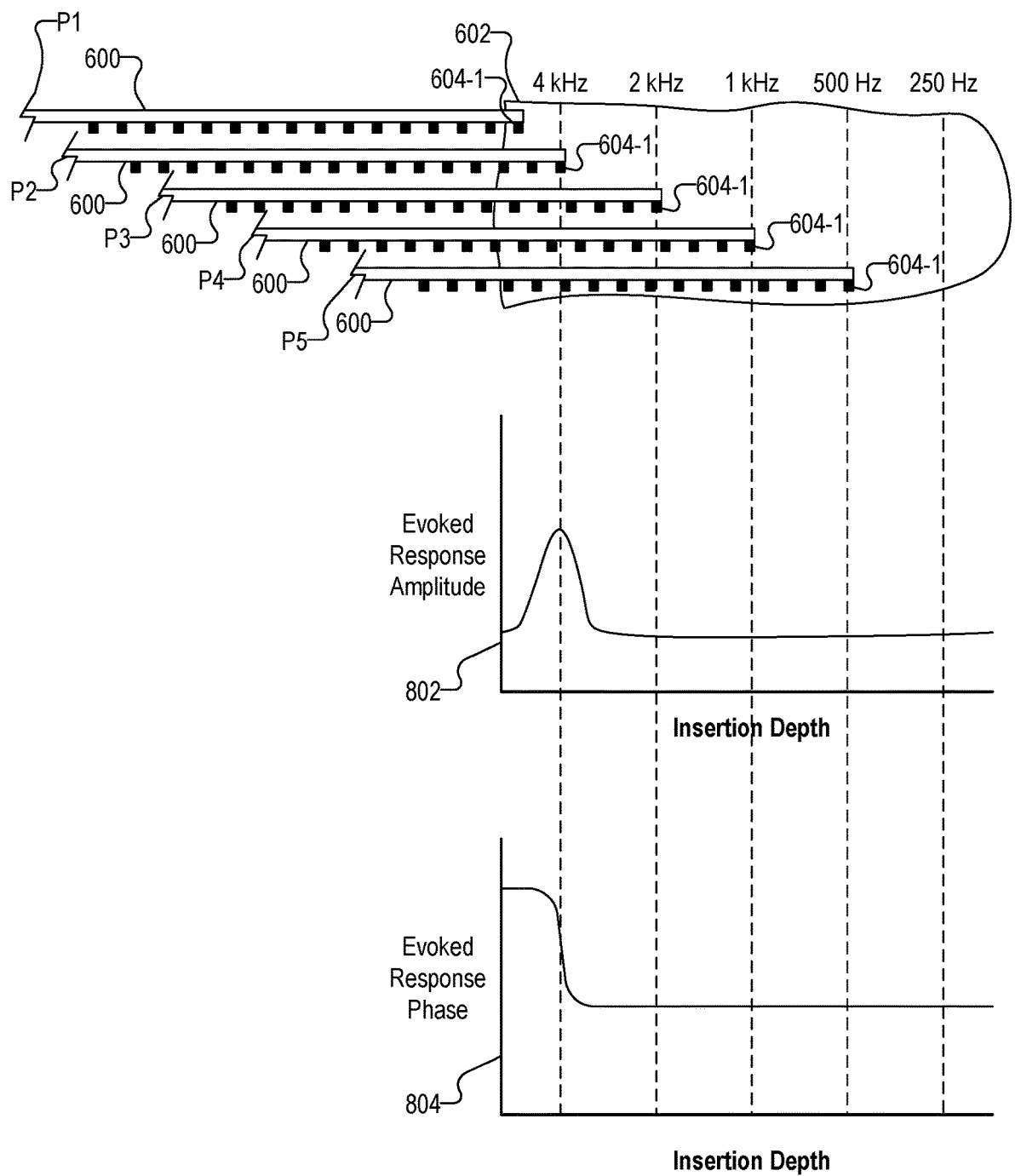
FIGS. 8-12 show exemplary graphs of evoked response signals that may be generated according to principles described herein.

To illustrate, FIG. 8 illustrates an exemplary lead insertion procedure in which electrode lead 600 is advanced into cochlea 602. Reference numbers P1 through P5 indicate positions of electrode lead 600. For example, at position P1, electrode lead 600 is at a first position in which electrode 604-1 is approaching the characteristic frequency location that corresponds to 4 kHz. At position P2, electrode lead 600 is at a second position in which electrode 604-1 is at the characteristic frequency location that corresponds to 4 kHz. At positions P3-P5, electrode lead 600 is at third, fourth, and fifth positions, respectively, in which electrode 604-1 has been advanced past the characteristic frequency location that corresponds to 4 kHz.

FIG. 8 also shows a graph 802 of an amplitude of an evoked response signal recorded by electrode 604-1 during the lead insertion procedure and a graph 804 of a phase of the evoked response signal recorded by electrode 604-1 during the lead insertion procedure. In this example, the evoked response signal is generated in response to acoustic stimulation having a stimulus frequency of 4 kHz. Hence, as shown in graph 802, as electrode lead 600 advances towards the characteristic frequency location that corresponds to 4 kHz, the amplitude of the evoked response signal increases and peaks when electrode lead 600 is positioned at position P2. As electrode lead 600 passes the characteristic frequency location that corresponds to 4 kHz, the evoked response amplitude decreases until it settles at a steady state value. As shown in graph 804, as electrode lead 600 advances towards the characteristic frequency location that corresponds to 4 kHz, the phase of the evoked response remains at a relatively high level. However, the phase suddenly changes to a relatively low level as electrode lead 600 passes the characteristic frequency location that corresponds to 4 kHz.

As shown in FIG. 8, the decreasing of the evoked response amplitude and the changing of the phase from the high level to the low level occur at substantially the same time, and both occur as electrode 604-1 passes the characteristic frequency location that corresponds to 4 kHz. Hence, diagnostic system 300 may determine that electrode 604-1 passes the characteristic frequency location that corresponds to 4 kHz by detecting, within a predetermined time period, that both an amplitude of the evoked response signal recorded by electrode 604-1 decreases by at least an amplitude threshold amount and a phase of the evoked response signal recorded by electrode 604-1 changes by at least a phase threshold amount. The predetermined time period, the amplitude threshold amount, and/or the phase threshold amount may each be set by diagnostic system 300 to be any suitable value. For example, the predetermined time period may be set to be a relatively short time period (e.g., less than a few milliseconds) to ensure that the change in amplitude and in phase correspond to one another. In some examples, diagnostic system 300 may set the predetermined time period, the amplitude threshold amount, and/or the phase threshold in response to user input (e.g., by way of a graphical user interface). Additionally or alternatively, diagnostic system 300 may set the predetermined time period, the amplitude threshold amount, and/or the phase threshold automatically based on one or more factors, such as hearing loss, the stimulus frequency, recipient characteristics (e.g., age, gender, etc.), etc.

Graphs 802 and 804 assume that the stimulus frequency remains at 4 kHz even after electrode 604-1 passes the characteristic frequency location that corresponds to 4 kHz. However, the flat lines shown after the amplitude and phase settle to steady state are, in some examples, not helpful to a user performing the insertion procedure.

Hence, in accordance with the systems and methods described herein, in response to determining that electrode 604-1 passes a characteristic frequency location corresponding to one of the stimulus frequency values included in the sequence of decreasingly lower values, system 300 may decrease the stimulus frequency to a next lower value included in the sequence of decreasingly lower values. For example, with reference to FIG. 8, system 300 may decrease the stimulus frequency to 2 kHz in response to electrode 604-1 passing the characteristic frequency location that corresponds to 4 kHz. In so doing, the amplitude of the evoked response signal recorded by electrode 604-1 may again increase until electrode 604-1 is positioned at the characteristic frequency location that corresponds to 2 kHz. As electrode lead 600 passes the characteristic frequency location that corresponds to 2 kHz, the evoked response amplitude decreases in a similar manner as shown in FIG. 8. The phase of the evoked response signal likewise changes in a similar manner as shown in FIG. 8. This process may be repeated as electrode 604-1 passes other characteristic frequency locations within cochlea 602.

Figure 9:
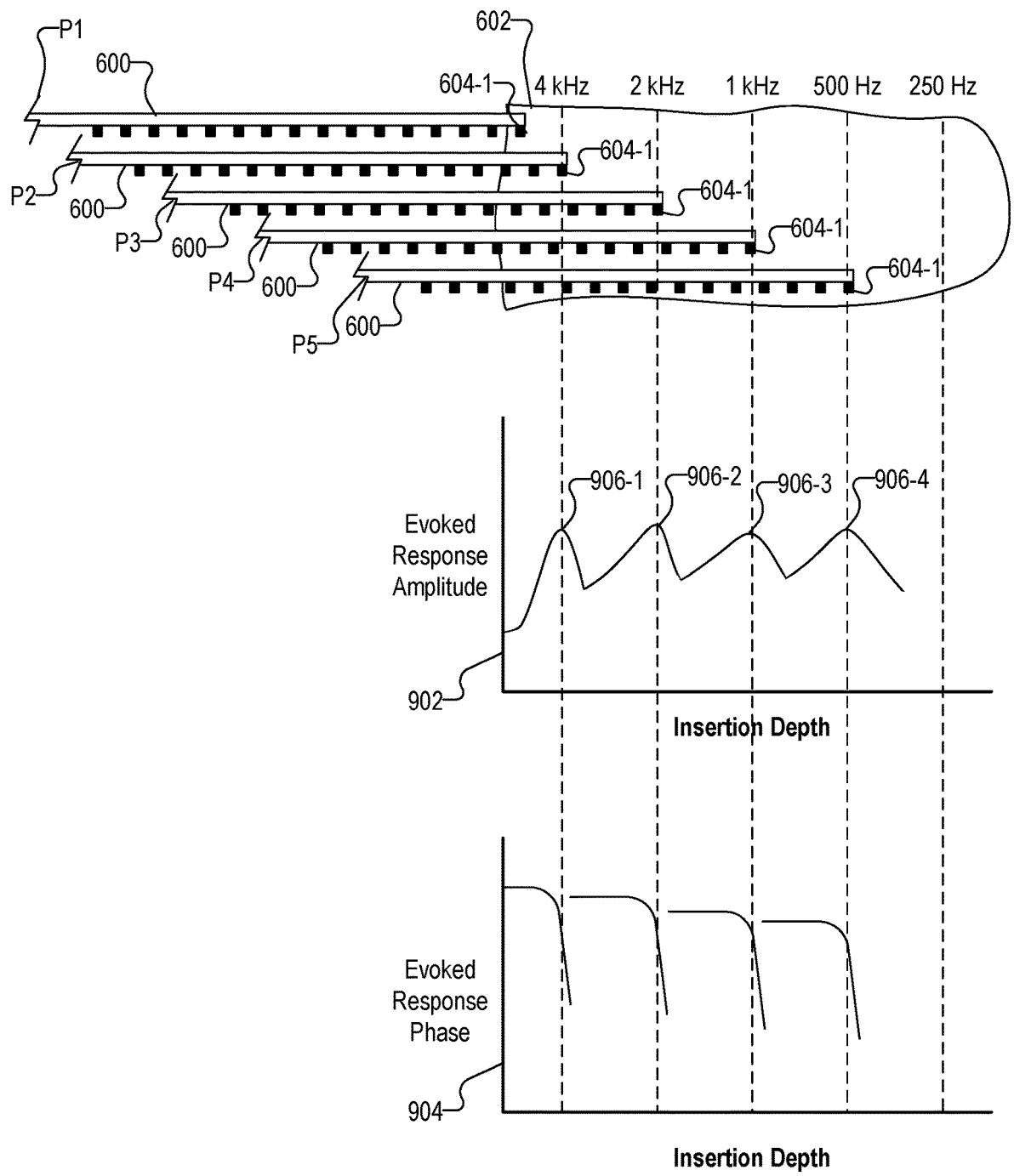

FIG. 9 shows a graph 902 of an amplitude of an evoked response signal recorded by electrode 604-1 while diagnostic system 300 sequentially steps through stimulus frequency values of 4 kHz, 2 kHz, 1 kHz, and 500 kHz as described above. FIG. 9 also shows a graph 904 of a phase of the evoked response signal recorded by electrode 604-1 while diagnostic system 300 sequentially steps through stimulus frequency values of 4 kHz, 2 kHz, 1 kHz, and 500 kHz as described above. As shown in graph 902, the amplitude of the evoked response signal includes a series of peaks 906 (e.g., 906-1 through 906-4) that temporally align with when electrode 604-1 passes characteristic frequency locations corresponding to the stimulus frequency values. Likewise, as shown in graph 904, the phase of the evoked response signal alternates between high and low values in a periodic manner that is temporally aligned with when electrode 604-1 passes characteristic frequency locations corresponding to the stimulus frequency values.

Diagnostic system 300 may direct a display device (e.g., display device 408) to display a graph of the evoked response signal recorded by electrode 604-1. In some examples, diagnostic system 300 may direct the display device to display the graph in substantially real time as the insertion procedure is being performed.

Figure 10:
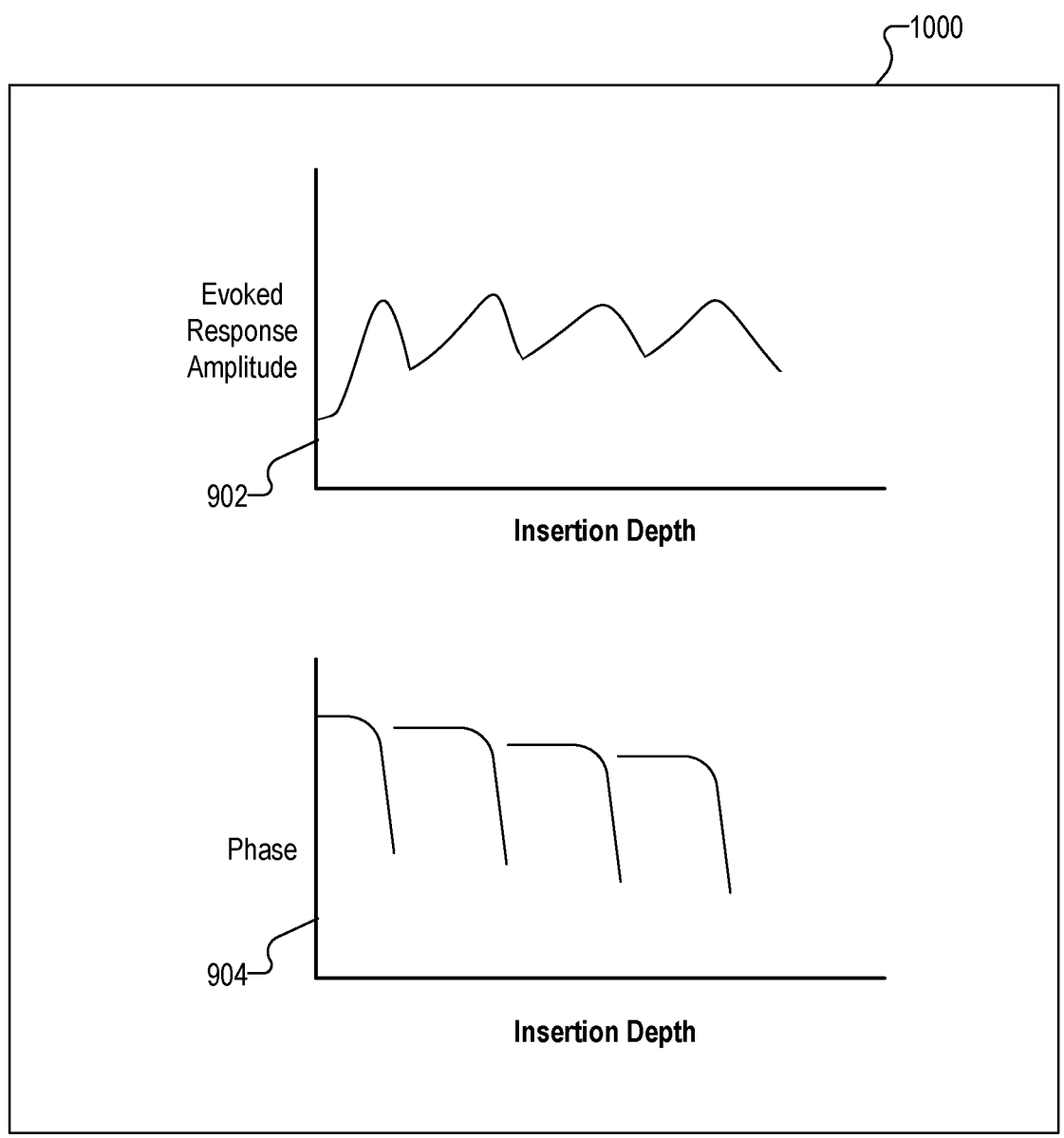

To illustrate, FIG. 10 shows an exemplary graphical user interface 1000 that may be displayed by a display device at the direction of diagnostic system 300. As shown, graphical user interface includes graph 902 and graph 904. In alternative embodiments, only one of graph 902 and graph 904 may be displayed within graphical user interface 1000.

By displaying a graph of the evoked response signal recorded by electrode 604-1 during the insertion procedure, diagnostic system 300 may provide real-time feedback to a user (e.g., a surgeon) performing the insertion procedure. This feedback may be used by the user to ensure proper placement of the electrode lead 600 within cochlea 602 and/or for any other purpose as may serve a particular implementation.

For example, diagnostic system 300 may detect, within a predetermined time period, that an amplitude of the evoked response signal decreases by at least an amplitude threshold amount without a phase of the evoked response signal changing by at least a phase threshold amount. This may indicate a possible occurrence of trauma to cochlea 602. Such trauma may be caused by electrode lead 600 penetrating a wall of cochlea 602, inadvertently being placed within a wrong duct of cochlea 602, and/or in any other suitable manner. In response, diagnostic system 300 may provide, to the user, a notification indicating the possible occurrence of trauma.

Figure 11:
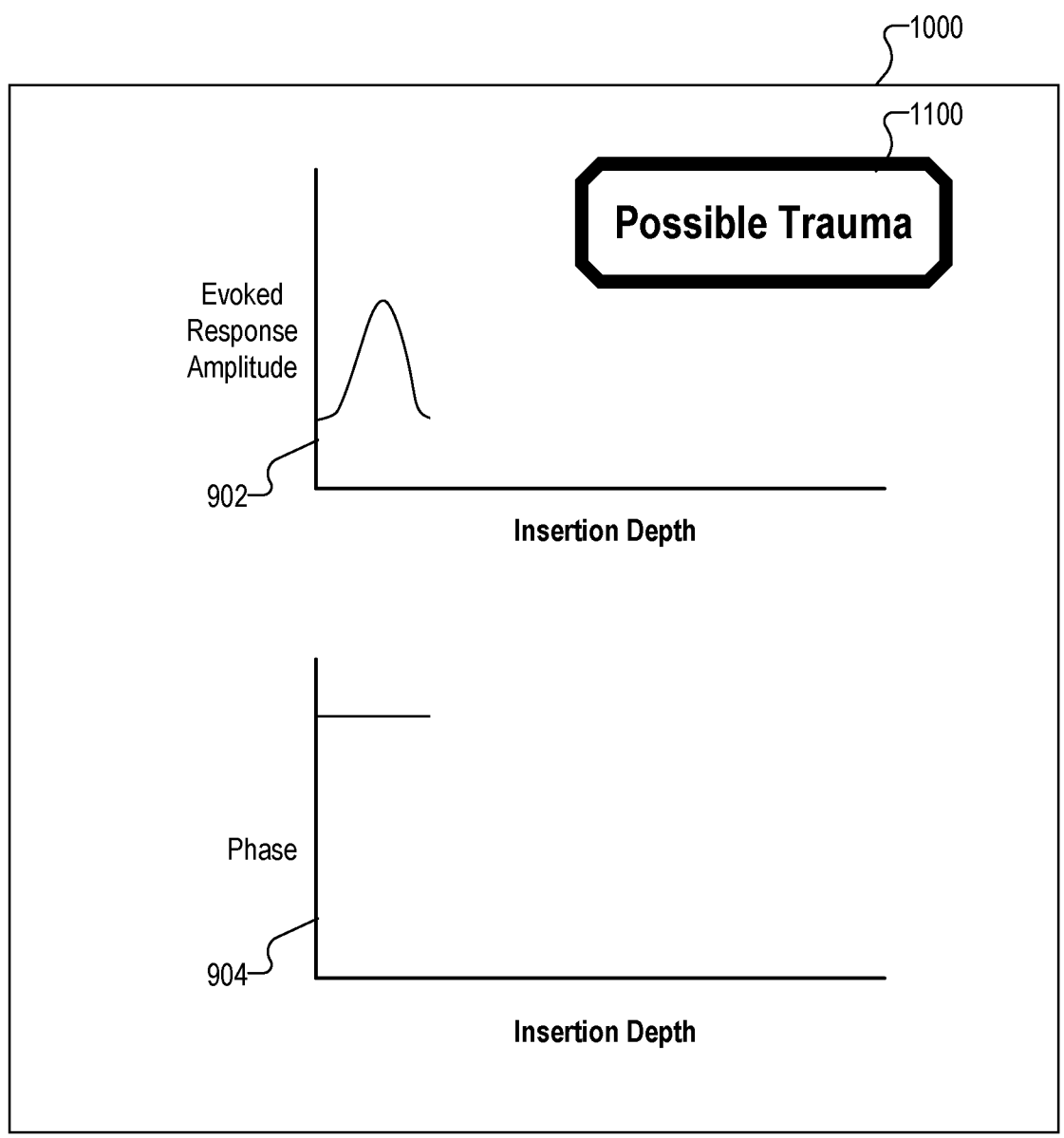

To illustrate, FIG. 11 shows graphical user interface 1000 after an amplitude of the evoked response signal decreases without a corresponding change in phase. As shown, a notification 1100 is included within graphical user interface 1000. Notification 1100 indicates a possible occurrence of trauma. In response to seeing notification 1100 appear within graphical user interface 1000, a user may stop the insertion procedure and/or take other remedial action (e.g., by pulling back the electrode lead outside the cochlea, changing electrode insertion angle, etc.). Any other type of notification (e.g., audible or visible notification) may additionally or alternatively be presented to the user as may serve a particular implementation.

The sequence of decreasingly lower stimulus frequency values described in the examples provided herein are merely exemplary. Additional or alternative stimulus values may be included in the sequence as may serve a particular implementation. In some examples, the initial value included in the sequence is greater than 2 kHz and the final value is less than 2 kHz. To illustrate, the sequence of decreasingly lower values may include an initial value that is between 4.5 kHz and 2.5 kHz, a second value that is between 2.5 kHz and 1.5 kHz, a third value that is between 1.5 kHz and 750 Hz, a fourth value that is between 750 Hz and 375 Hz, and a final value that is between 375 Hz and 0 Hz.

As mentioned, diagnostic system 300 may additionally or alternatively direct an acoustic stimulation generator to apply acoustic stimulation having a plurality of stimulus frequencies (i.e., concurrently) to a recipient of a cochlear implant during an insertion procedure in which an electrode lead communicatively coupled to the cochlear implant is inserted into a cochlea of the recipient. Diagnostic system 300 may direct the cochlear implant to use electrode 604-1 to record a plurality of evoked response signals during the insertion procedure. The evoked response signals each correspond to a different stimulus frequency included in the plurality of stimulus frequencies.

Figure 12:
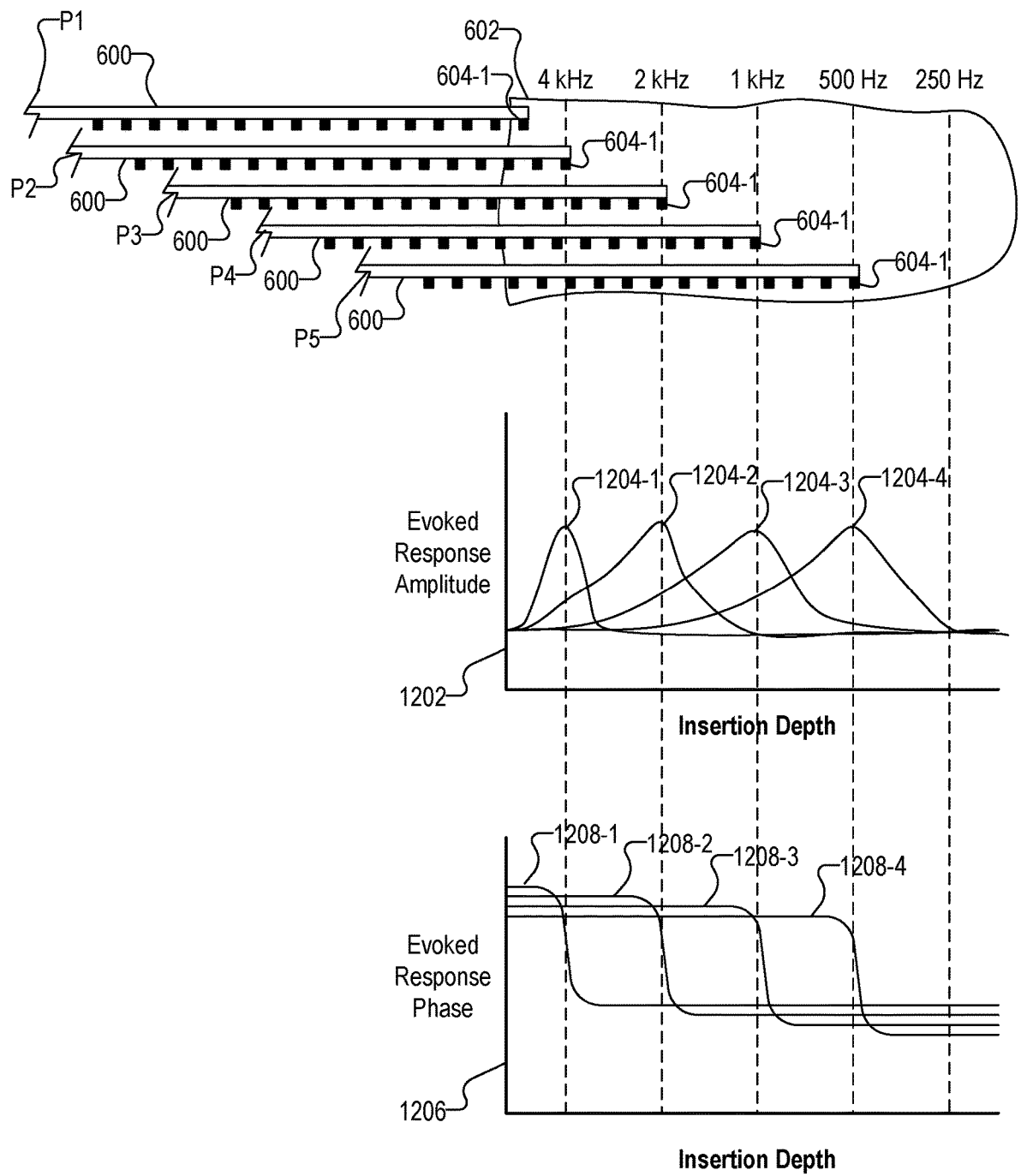

For example, FIG. 12 illustrates an exemplary configuration in which the acoustic stimulation includes stimulus frequencies of 4 kHz, 2 kHz, 1 kHz, and 500 Hz. FIG. 12 also shows a graph 1202 of an amplitude of a plurality of evoked response signals 1204 (e.g., evoked response signals 1204-1 through 1204-4) recorded by electrode 604-1 during the lead insertion procedure and a graph 1206 of a plurality of phase signals 1208 corresponding to evoked response signals 1204. Each evoked response signal 1204 and phase signal 1208 correspond to a different stimulus frequency. For example, evoked response signal 1204-1 and phase signal 1208-1 correspond to 4 kHz, evoked response signal 1204-2 and phase signal 1208-2 correspond to 2 kHz, evoked response signal 1204-3 and phase signal 1208-3 correspond to 1 kHz, and evoked response signal 1204-4 and phase signal 1208-4 correspond to 500 Hz.

In practice, graphs 1202 and 1206 may be difficult to interpret by a user, especially in real time during an insertion procedure. This is because all of the signals 1204 and 1208 are plotted concurrently. Accordingly, diagnostic system 300 may plot, by way of a display device, a graph of the evoked response signals in substantially real time as the insertion procedure is being performed by switching between displaying each evoked response signal included in the plurality of evoked response signals such that, at any given time, only a single evoked response that has a highest amplitude compared to other evoked response signals in the plurality of evoked response signals is displayed by the display device. This may result in the same graphs being displayed as are displayed if the acoustic stimulation has only a single stimulus frequency value at any given time, as described above. For example, by switching between displaying each evoked response signal in this manner, graph 902 and/or graph 904 being displayed by display device, as shown in FIG. 10.

Figure 13:
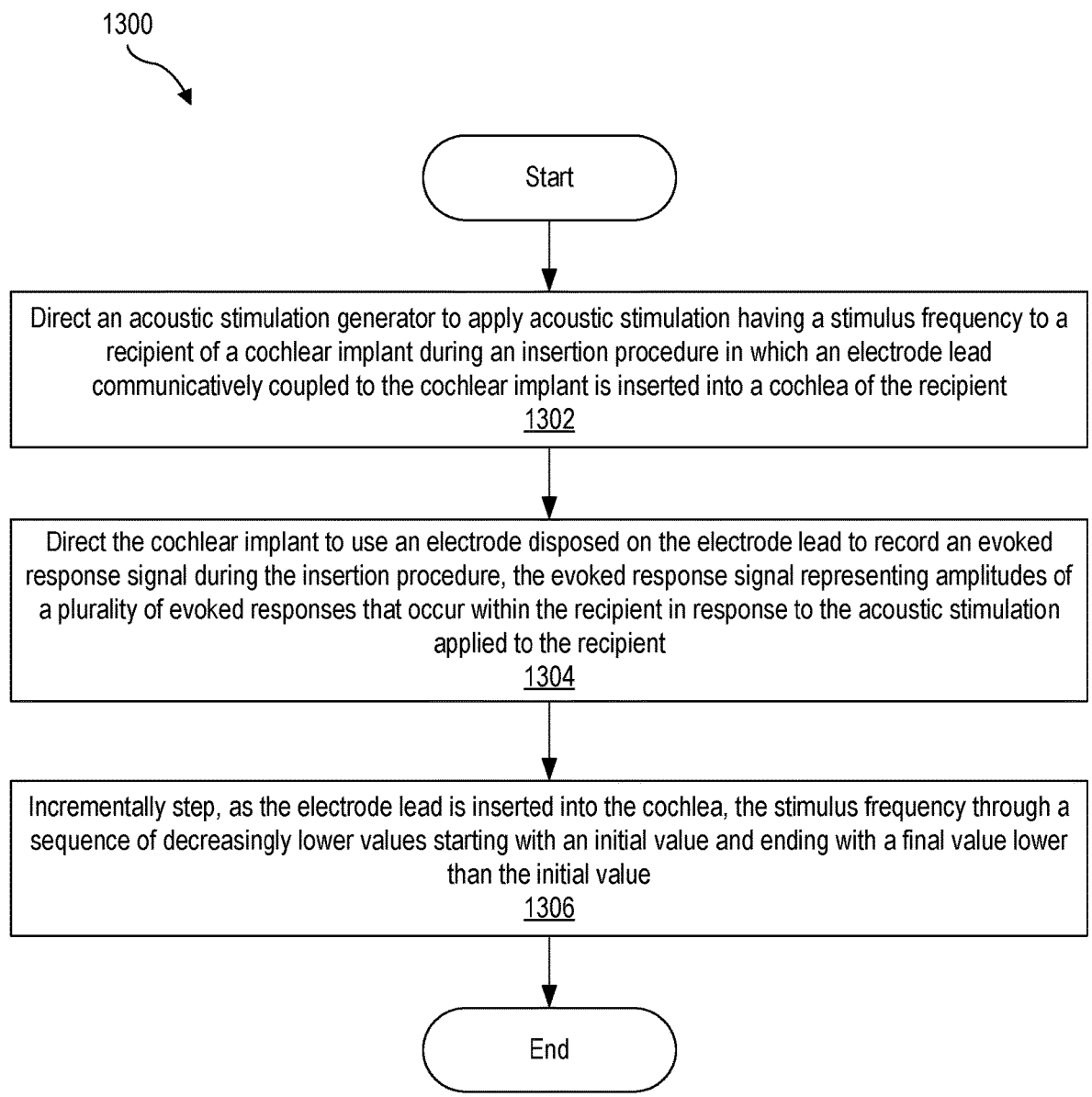
FIG. 13 illustrates an exemplary method according to principles described herein.

FIG. 13 illustrates an exemplary method 1300. The operations shown in FIG. 13 may be performed by diagnostic system 300 and/or any implementation thereof. While FIG. 13 illustrates exemplary operations according to one embodiment, other embodiments may omit, add to, reorder, and/or modify any of the operations shown in FIG. 13.

In operation 1302, a diagnostic system directs an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient. Operation 1302 may be performed in any of the ways described herein.

In operation 1304, the diagnostic system directs the cochlear implant to use an electrode disposed on the electrode lead to record an evoked response signal during the insertion procedure, the evoked response signal representing amplitudes of a plurality of evoked responses that occur within the recipient in response to the acoustic stimulation applied to the recipient. Operation 1304 may be performed in any of the ways described herein.

In operation 1306, the diagnostic system incrementally steps, as the electrode lead is inserted into the cochlea, the stimulus frequency through a sequence of decreasingly lower values starting with an initial value and ending with a final value lower than the initial value. Operation 1306 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 14:
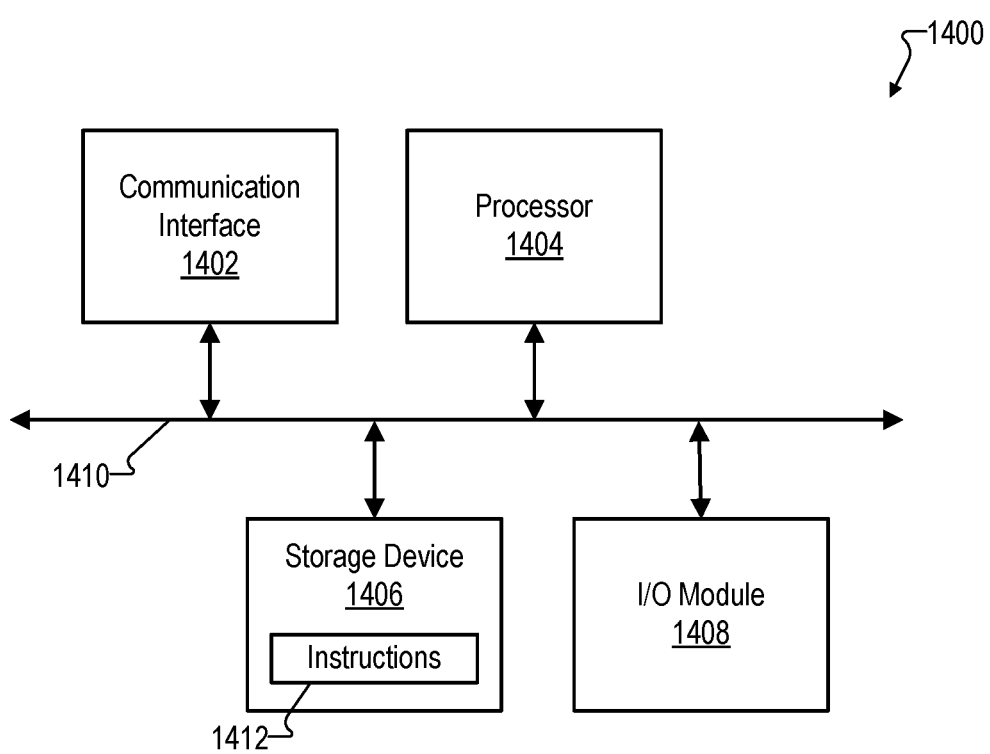
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected one to another via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data and/or interpreting, executing, and/or directing execution of one or more of the instructions, processes, and/or operations described herein. Processor 1404 may perform operations by executing computer-executable instructions 1412 (e.g., an application, software, code, and/or other executable data instance) stored in storage device 1406.

Storage device 1406 may include one or more data storage media, devices, or configurations and may employ any type, form, and combination of data storage media and/or device. For example, storage device 1406 may include, but is not limited to, any combination of the non-volatile media and/or volatile media described herein. Electronic data, including data described herein, may be temporarily and/or permanently stored in storage device 1406. For example, data representative of computer-executable instructions 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1400. For example, storage facility 302 may be implemented by storage device 1406, and processing facility 304 may be implemented by processor 1404.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions;
a processor communicatively coupled to the memory and configured to execute the instructions to:
 direct an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient;
 direct the cochlear implant to use an electrode disposed on the electrode lead to record an evoked response signal during the insertion procedure, the evoked response signal representing amplitudes of a plurality of evoked responses that occur within the recipient in response to the acoustic stimulation applied to the recipient; and
 incrementally step, as the electrode lead is inserted into the cochlea, the stimulus frequency through a sequence of decreasingly lower values starting with an initial value and ending with a final value lower than the initial value; wherein:
the processor is further configured to execute the instructions to determine, while the stimulus frequency has the initial value, that the electrode passes a characteristic frequency location within the cochlea and corresponding to the initial value; and
the incremental stepping of the stimulus frequency comprises decreasing, in response to the determination that the electrode passes the characteristic frequency location, the stimulus frequency from the initial value to a next lower value included in the sequence of decreasingly lower values.

2. The system of claim 1, wherein the determining that the electrode passes the characteristic frequency location comprises:
performing an excitation spread measurement with respect to the electrode and at least one other electrode disposed on the electrode lead; and determining, based on the excitation spread measurement, a number of electrodes disposed on the electrode lead that are located within the cochlea.

3. The system of claim 1, wherein the determining that the electrode passes the characteristic frequency location comprises detecting, within a predetermined time period, that both an amplitude of the evoked response signal decreases by at least an amplitude threshold amount and a phase of the evoked response signal changes by at least a phase threshold amount.

4. The system of claim 1, wherein:
the processor is further configured to execute the instructions to determine, while the stimulus frequency has the next lower value, that the electrode passes a second characteristic frequency location within the cochlea and corresponding to the next lower value; and
the incremental stepping of the stimulus frequency comprises decreasing, in response to the determination that the electrode passes the second characteristic frequency location, the stimulus frequency from the next lower value to another next lower value included in the sequence of decreasingly lower values.

5. The system of claim 1, wherein the processor is further configured to execute the instructions to:
detect, within a predetermined time period, that an amplitude of the evoked response signal decreases by at least an amplitude threshold amount without a phase of the evoked response signal changing by at least a phase threshold amount; and
provide, in response to the detecting, a notification indicating a possible occurrence of trauma to the cochlea.

6. The system of claim 1, wherein the initial value is greater than 2 kHz and the final value is less than 2 kHz.

7. The system of claim 1, wherein the sequence of decreasingly lower values comprises:
the initial value that is between 4.5 kHz and 2.5 kHz;
a second value that is between 2.5 kHz and 1.5 kHz;
a third value that is between 1.5 kHz and 750 Hz;
a fourth value that is between 750 Hz and 375 Hz; and
the final value that is between 375 Hz and 0 Hz.

8. The system of claim 1, wherein the processor is further configured to execute the instructions to direct a display device to display a graph of the evoked response signal.

9. The system of claim 8, wherein the directing of the display device to display the graph of the evoked response signal comprises directing the display device to display the graph of the evoked response signal in substantially real time as the insertion procedure is being performed.

10. The system of claim 8, wherein the directing of the display device to display the graph of the evoked response signal comprises directing the display device to display:
a first graph representative of an amplitude of the evoked response signal; and
a second graph representative of a phase of the evoked response signal.

11. The system of claim 1, wherein the electrode is a distal-most electrode disposed on the electrode lead.

12. A method comprising:
directing, by a diagnostic system, an acoustic stimulation generator to apply acoustic stimulation having a stimulus frequency to a recipient of a cochlear implant during an insertion procedure in which an electrode lead communicatively coupled to the cochlear implant is inserted into a cochlea of the recipient;
directing, by the diagnostic system, the cochlear implant to use an electrode disposed on the electrode lead to record an evoked response signal during the insertion procedure, the evoked response signal representing amplitudes of a plurality of evoked responses that occur within the recipient in response to the acoustic stimulation applied to the recipient; and
incrementally stepping, by the diagnostic system as the electrode lead is inserted into the cochlea, the stimulus frequency through a sequence of decreasingly lower values starting with an initial value and ending with a final value lower than the initial value; wherein
the method further comprises determining, by the diagnostic system while the stimulus frequency has the initial value, that the electrode passes a characteristic frequency location within the cochlea and corresponding to the initial value; and
the incremental stepping of the stimulus frequency comprises decreasing, in response to the determination that the electrode passes the characteristic frequency location, the stimulus frequency from the initial value to a next lower value included in the sequence of decreasingly lower values.

13. The method of claim 12, wherein the determining that the electrode passes the characteristic frequency location comprises:
performing an excitation spread measurement with respect to the electrode and at least one other electrode disposed on the electrode lead; and
determining, based on the excitation spread measurement, a number of electrodes disposed on the electrode lead that are located within the cochlea.

14. The method of claim 12, wherein the determining that the electrode passes the characteristic frequency location comprises detecting, within a predetermined time period, that both an amplitude of the evoked response signal decreases by at least an amplitude threshold amount and a phase of the evoked response signal changes by at least a phase threshold amount.

15. The method of claim 12, further comprising:
determining, by the diagnostic system while the stimulus frequency has the next lower value, that the electrode passes a second characteristic frequency location within the cochlea and corresponding to the next lower value; and
the incremental decreasing of the stimulus frequency comprises decreasing, in response to the determination that the electrode passes the second characteristic frequency location, the stimulus frequency from the next lower value to another next lower value included in the sequence of decreasingly lower values.

16. The method of claim 12, further comprising:
detecting, by the diagnostic system within a predetermined time period, that an amplitude of the evoked response signal decreases by at least an amplitude threshold amount without a phase of the evoked response signal changing by at least a phase threshold amount; and
providing, by the diagnostic system in response to the detecting, a notification indicating a possible occurrence of trauma to the cochlea.

* * * * *